Feb. 16, 1943.    L. T. SHERWOOD    2,311,191
JOINT STRUCTURE FOR CORRUGATED GLASS SHEETS
Filed Dec. 21, 1940
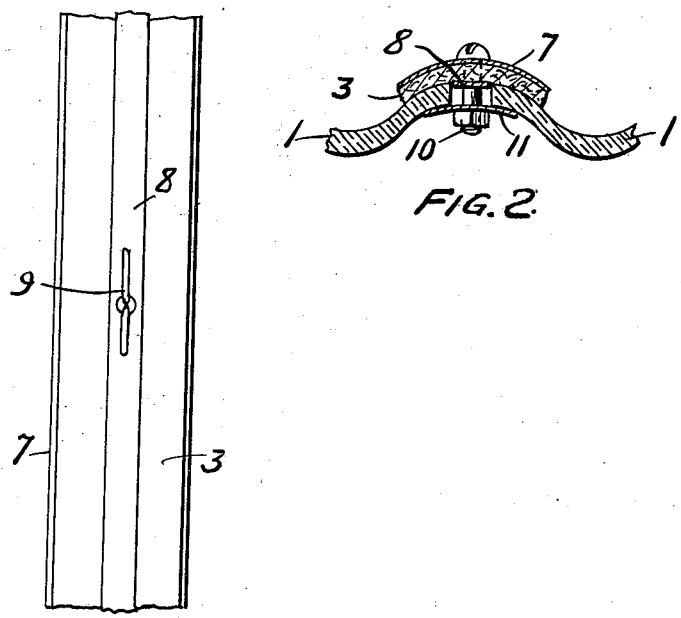
INVENTOR
Laurence T. Sherwood
BY
Augustus B. Stoughton
ATTORNEY.
WITNESS:

Patented Feb. 16, 1943

2,311,191

UNITED STATES PATENT OFFICE 2,311,191

JOINT STRUCTURE FOR CORRUGATED GLASS SHEETS

Laurence T. Sherwood, Connellsville, Pa., assignor to Pennsylvania Wire Glass Company, Philadelphia, Pa., a corporation of Pennsylvania Application December 21, 1940, Serial No. 371,169

2 Claims. (Cl. 108—16)

The principal object of the present invention is to improve cover caps used in connection with corrugated glass sheets in such a way that they are capable of being prefabricated and in use perform their appropriate functions and increase the durability of the structure as a whole.

Another object of the invention will appear from the following description at the end of which the invention will be claimed.

Generally stated, the invention consists in strips of glass fiber rope or fabric or glass fiber mat including a binder, and a support for holding the strip in place with respect to the glass. The support and strip preferably providing a prefabricated unit.

The invention also comprises the improvements to be presently described and finally claimed.

In the following description reference will be made to the acompanying drawing forming part hereof and in which, Figure 1 is a view of the inside of a cover cap embodying features of the invention, and Figure 2 is a sectional view taken at right angles to the plane of the section in Figure 1 and illustrating the application of a cover cap shown in Figure 1.

When the mat contains a water repellent, it serves in making joints rain tight. Examination of Figure 2 will assist in understanding this point. Strips of such mat resemble cushions and accommodate difference in expansion or contraction of corrugated sheets of glass, either plain or wire. Glass strips of the character described do not deteriorate under conditions to which they are exposed, but they are difficult to handle and install during the erection of a corrugated glass structure unless they are prefabricated along with a support and installed as units.

The cover cap in Figure 1 comprises a comparatively wide metal strip 7 lined with a fiber glass strip and a comparatively narrow metal strip 8. The three parts are secured together as by means of a detachable clip 9. The structure, therefore, comprises a prefabricated glazing units in which the glass strip 3 is supported by the metal strips 7 and 8. This cover strip is used at the meeting edges of adjacent sheets of corrugated glass and its use is illustrated in Figure 2. The cover cap is applied at the spaced edges of the sheets of corrugated glass so as to cover the space between them. The strip 7 is a support for the fiber glass strip 3 and holds it up to the corrugated glass sheets. The strip 8, having served its purpose of supporting strip 3 prior to erection, is out of the way in the space between the meeting edges of the corrugated glass sheets. The clips 9 are removed and replaced by bolts 10 which engage the strip 7 and also a metal strip 11 which overlaps the marginal portion of the corrugated glass sheets 1.

Heretofore, in order to make cover cap joints strictly tight against wind-driven rain, it has been necessary to seal them with a putty-like material. Sealing in this manner is laborious and accordingly expensive. When the glass fiber mat, impregnated with a water repellent, is compressed under the cover cap as indicated, the joint is tight against wind-driven rain without putty or the like. Moreover, in comparison with other materials—sponge rubber for example—which might make a tight joint without putty, glass fiber mats are not subject to deterioration from aging, rotting, and the like.

It will be obvious to those skilled in the art to which the invention relates that modifications may be made in details of construction and arrangement and matters of mere form without departing from the spirit of the invention which is not limited to such matters or otherwise than the appended claims may require.

I claim:

1. A joint structure for corrugated glass sheets spaced apart at their adjacent edges comprising a cover cap having a lining of a strip of glass fiber mat containing a water repellant, a comparatively narrow bar overlying the strip of glass fiber mat and adapted to enter the space between the edges of the glass sheets and to hold the glass fiber mat in compression up to the cover strip, and clips passing through the cover cap, strip of glass fiber mat and bar.

2. A joint structure for corrugated glass sheets spaced apart at their adjacent edges comprising a cover cap having a lining of a strip of glass fiber mat containing a water repellant and a binder, a comparatively narrow bar overlying the strip of glass fiber mat and adapted to enter the space between the edges of the glass sheets, and clips passing through the cover cap, strip of glass fiber mat and bar.

LAURENCE T. SHERWOOD.